United States Patent

Feres

[11] Patent Number: 5,264,079
[45] Date of Patent: Nov. 23, 1993

[54] FILM-TYPE EVAPORATOR

[76] Inventor: Vaclav Feres, 3002 Buena Vida Cir., Las Cruces, N. Mex. 88001

[21] Appl. No.: 843,233

[22] Filed: Feb. 28, 1992

[30] Foreign Application Priority Data

Feb. 28, 1991 [DE] Fed. Rep. of Germany ....... 4106300

[51] Int. Cl.$^5$ ............................................. B01D 1/22
[52] U.S. Cl. .................................. 159/6.1; 159/13.3; 159/42; 159/49; 165/88; 165/115; 202/236; 202/238; 203/89
[58] Field of Search ............... 202/236, 238, 237; 203/89; 159/6.1, 13.3, 49, 28.1, 42, 44; 165/115, 88

[56] References Cited

U.S. PATENT DOCUMENTS

| | | | |
|---|---|---|---|
| 1,936,524 | 11/1933 | Placek | 159/6.1 |
| 2,169,601 | 8/1939 | Cornelius et al. | 159/6.1 |
| 2,537,833 | 1/1951 | Joos | 159/6.1 |
| 3,472,304 | 10/1969 | Evkin | 159/6.1 |
| 4,065,346 | 12/1977 | Evkin et al. | 159/6.1 |
| 4,199,398 | 4/1980 | Evkin | 159/6.1 |
| 4,202,846 | 5/1980 | Shafranousky et al. | 159/6.1 |
| 4,287,019 | 9/1981 | Standiford | 159/6.1 |

FOREIGN PATENT DOCUMENTS

| | | | |
|---|---|---|---|
| 0965438 | 10/1982 | U.S.S.R. | 159/6.1 |
| 0929747 | 6/1963 | United Kingdom | 159/6.1 |

*Primary Examiner*—Virginia Manoharan
*Attorney, Agent, or Firm*—Antonelli, Terry, Stout & Kraus

[57] ABSTRACT

A film-type evaporator has a vapor chamber, a rotor rotating therein, at least one evaporating surface extending outwards from the rotor axis and a heating chamber rotating therewith and sealed with respect to the vapor chamber. The starting product is fed onto the evaporating surface close to the rotor axis and spreads outwards in film-like manner due to the centrifugal force on the evaporating surface. A uniform film thickness is achieved in that the evaporating surface is a curved blade surface, which is formed by a generatrix substantially parallel to the rotor axis and whose axial extension is limited by upper and lower stop ledges, and that the concave side of the evaporating surface is directed in the circumferential direction of rotation of the rotor.

16 Claims, 2 Drawing Sheets

FILM-TYPE EVAPORATOR

FIELD OF THE INVENTION

The invention relates to a film-type evaporator with a vapor chamber, a rotor rotating therein, at least one evaporating surface extending outwards from the rotor axis and a heating chamber rotating therewith and sealed with respect to the vapor chamber, the starting product being fed onto the evaporating surface close to the rotor axis, is spread outwards in film-like manner due to the centrifugal force on the evaporating surface and the concentrate is removed at the outside.

BACKGROUND AND SUMMARY OF THE INVENTION

Film-type evaporators having the aforementioned construction are known in numerous different forms (DE No. 24 09 502, DE No. 1 114 783, U.S. Pat. No. 3,430,690, U.S. Pat. No. 4,167,454). They are more particularly used in the chemical, food and pharmaceutical industries for the distillation and concentration of thermally sensitive products. For boiling point reduction purposes they are often operated with a vacuum. The starting product which is fed onto the evaporating surface close to the rotor axis, spreads outwards in the form of a film due to the centrifugal force. The boiling component evaporates in the vapor chamber, while the concentration in the film increases to the outside. On the outside the concentrate is removed, but is optionally also supplied to a second, similar evaporating stage. The heating chamber of each evaporating surface is connected to its own heating circuit, which e.g. operates with heating steam.

The heat transfer in the liquid film, which moves in a laminar or pseudolaminar flow, essentially takes place through pure heat conduction with surface evaporation. This is helped by the fact that in the centrifugal field the film is under a slight overpressure. The film thickness and residence time of the product on the evaporating surface can be influenced by a rotor speed change and in particular the residence time can be shortened to a few seconds compared with film-type evaporators having fixed evaporating surfaces, which leads to a particularly careful treatment and limited quality reductions in the concentrate. High viscosity liquids can also be processed on the rotating evaporating surfaces.

The known film-type evaporators have conical evaporating surfaces on which the product rises to the outside. Limits are placed on the rotor speed by the fact that the film must not break or tear open, because otherwise caking and encrustation occurs. Further limiting factors are the feed quantity, the thickening ratio of the starting product to the concentrate and the cone angle of the evaporating surface. Conical evaporating surfaces suffer from the fundamental disadvantage that with increasing diameter the circumferential length and therefore the evaporating surface increases, so that towards the outside the film becomes increasingly thin and easily tears. If the product contains particles, the film can easily tear in the vicinity thereof. At the points where the evaporating surface is not covered by a film, the wall temperature rises, which can in turn lead to produce damage.

The problem of the present invention is to so develop a film-type evaporator with the construction described hereinbefore, that a constant quality in the concentrate is obtained and irregularities in the evaporation process are avoided.

According to the invention this problem is solved in that the evaporating surface is a curved blade surface, which is formed by a generatrix substantially parallel to the rotor axis and whose axial extension is limited by upper and lower stop ledges and that the concave side of the evaporating surface points in the circumferential direction.

Unlike in the case of the prior art film-type evaporators, in which the evaporating surfaces are constructed as solids of revolution with the rotor axis as the axis of symmetry, a completely new way is adopted by the invention. The blade-like evaporating surface is formed by an axially parallel generatrix. This means that the evaporating surface can always have the same axial extension from the inside to the outside, i.e. the evaporating surface does not increase from the inside to the outside. The thickness of the film spread on the evaporating surface is only reduced by the evaporation rate and can consequently be very accurately maintained or easily controlled by the feed quantity and/or the speed without other disturbing limiting factors. An uncontrolled spreading in the axial direction is not possible as a result of the centrifugal field and is prevented by the axial stop ledges or strips. Therefore the product is carefully and uniformly concentrated. Caking, encrustation and local overheating are completely avoided. These positive effects are assisted by the fact that the accelerative forces occurring during rotation press the film onto the evaporating surface and consequently there is a pressure rise in the film. This in particular suppresses bubble and froth formation.

In a preferred construction the evaporating surface is corrugated, the corrugations running in axially parallel manner. This improves the heat exchange and stability of the film, there is a certain holding back of the outwardly accelerated film and the evaporation rate on the tops of the corrugations or waves is increased as a result of the small film thickness there.

The evaporating surface forms part of a spiral surface emanating from the rotor axis. If the curvature corresponds to a logarithmic spiral, then the acceleration of the film at all points and also the pressure rise in the film is the same as for conical surfaces. In the case of particularly sensitive products, the axial width of the evaporating surfaces decreases outwardly from the rotor axis. Thus, over the entire evaporating surface an identical film thickness can be maintained, in that the evaporation rate is compensated by the outwardly decreasing evaporating surface.

According to a further advantageous development the heating chamber is bounded by the evaporating surface, a heating chamber wall running substantially parallel to its rear surface and the axial stop ledges. If heating steam is used as the heat carrier, as a result of the following heating chamber the condensate is driven to the outside and can be removed there.

A preferred embodiment results from the fact that the heating chamber wall is corrugated parallel to the stop ledges and that the evaporating surface with its corrugation tops facing the heating chamber is supported on the corrugation tops of the heating chamber wall facing it. As a result of this the evaporating surface can be constructed in a thin-walled manner. As a result of its corrugation, in conjunction with the corrugated heating chamber wall, it still forms a constructional unit stable under high speeds.

Appropriately the evaporating surface and the heating chamber wall are connected at their inner and outer ends with in each case an axially parallel tube, provided on the portion of its casing facing the heating chamber with openings and the tube located closer to the rotor axis is used for supply and the other tube for the discharge of the heating medium. The supply and discharge tubes for the heating medium also constitute a constructional part contributing to the stability of the evaporating surface and which are also used for the fastening thereof.

According to a further feature of the invention several blade-like evaporating surfaces with the same curvature and the heating chambers associated therewith are uniformly distributed in a radial plane of the rotor and several evaporating surfaces and heating chambers can be stacked in axially succeeding manner.

Thus, per space unit, compared with conventional film-type evaporators, a much larger evaporating surface can be housed and consequently the specific evaporating efficiency is much higher.

An advantageous construction is obtained if the rotor has a base with a hub for a drive shaft and axially spaced from said base a spider and between which are positioned the evaporating surfaces. As a result the rotor is a dimensionally stable structure, which is further stabilized in that the evaporating surfaces and the heating chambers associated therewith are fixed to the base by the tubes supplying and removing the heating medium and also fixed in the rotor by the spider projecting over them at the other end.

In order to rapidly remove the concentrate from the rotor without any further thermal loading, at their radially outer ends, where they are externally connected to the tube removing the heating medium, the evaporating surfaces run in channels, whose bottoms, from the base of the rotor to the spider have an increasing spacing from the rotor axis and that all the channels at their ends facing the base of the rotor terminate in a ring channel from which the concentrate collecting therein is removed by means of a skimming tube. Therefore the channels and the evaporating surfaces are readily accessible for maintenance and inspection purposes. The function of draining off the concentrate into the ring channel can also be assumed by a closed, conical rotor casing in place of the individual channels.

The supply of the liquid starting product to the evaporating surfaces, according to a preferred embodiment, takes place in that concentrically to the rotor axis a cylindrical ring channel extending over the axial extension of the evaporating surfaces is provided and its open side is directed towards the rotor axis and to which the starting product is supplied in axially distributed manner by means of a nozzle tube and that the evaporating surfaces are attached externally and in spaced manner to the ring channel and the latter has in the vicinity of the attachment points openings through which the starting product passes from the ring channel to the evaporating surfaces.

The invention is described in greater detail hereinafter relative to a nonlimitative embodiment and the attached drawings.

DETAILED DESCRIPTION OF THE DISCLOSED EMBODIMENT

Figure 1:
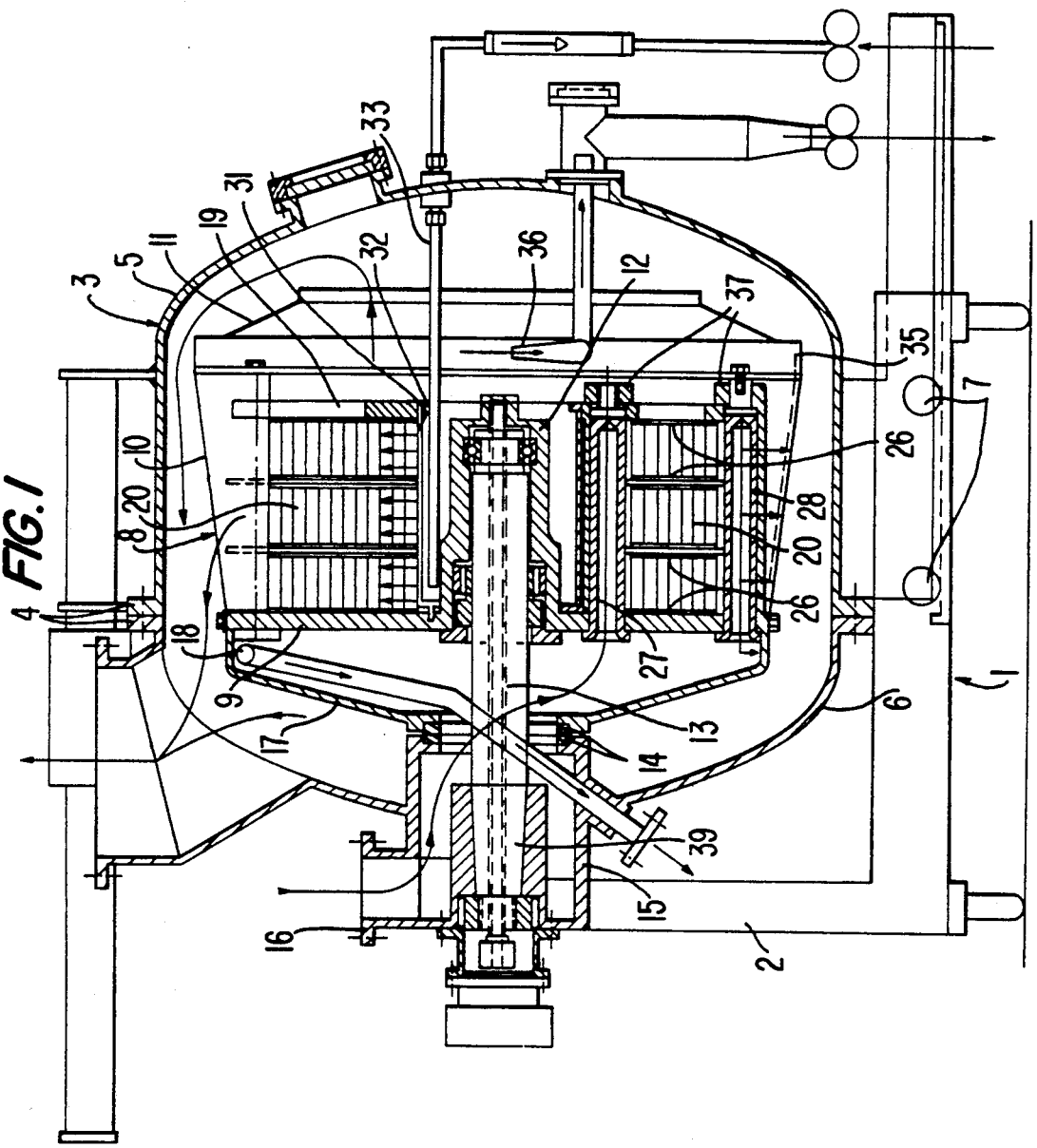
FIG. 1 is an axial section through a film-type evaporator.

The film-type evaporator according to FIG. 1 is located on an optionally movable, frame 1 with a support 2, on which the evaporator is supported on the drive side. The evaporator has a container 3, which comprises two container parts 5, 6 detachably connected by means of flanges 4 and whereof the container part 5 can be detached at the flanges for cleaning purposes and can be axially moved by means of the rolls 7 on the frame 1.

The container 1 essentially defines the vapor chamber of the evaporator. Within the container 1 is placed the rotor 8, which has a rigid base 9 and optionally a rotor casing 10, which from the base initially widens conically in the axial direction and is then drawn inwards somewhat in the portion 11.

In its center the base 9 of the rotor 8 is provided with a bearing box 12 drawn into the rotor and by means of which the rotor 8 is connected to a drive shaft 13, which runs in a hollow support shaft 39. The rotor base 9 is sealed by means of slip rings 14 on a stationary journal bearing 15, which is in turn supported on the support 2. The stationary journal bearing 15 has a hollow cylindrical form and is used for the supply of the heating steam fed in by means of the connection 16, while in the manner described hereinafter the condensed heating steam accumulates in the lower part of the rotor 8 and is removed with skimming tube 18.

Figure 2:
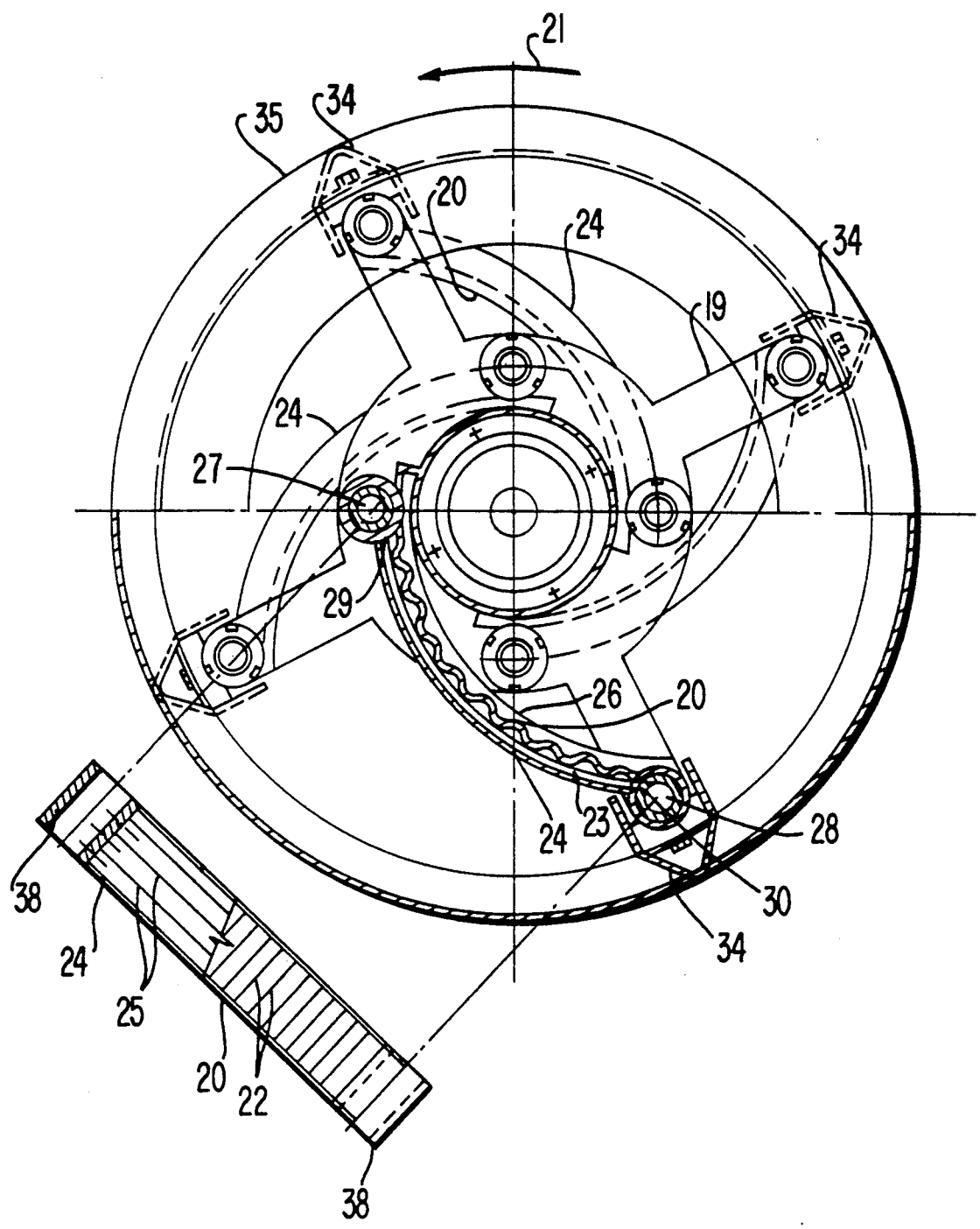
FIG. 2 is a part sectional, axial plan view of the interior of the rotor according to FIG. 1.

Between the base 9 of the rotor 8 and a spider 19 located in the rotor are fixed the evaporating surfaces 20 and in the represented embodiment there are in each case three evaporating surfaces stacked in the axial direction. As shown in FIG. 2, each evaporating surface 20 is curved outwards in blade-like manner from the rotor axis, while extending substantially axially parallel in a direction at right angles thereto. The concave side of the blade-like evaporating surface 20 opens in the circumferential direction of rotation 21 of the rotor 8. The evaporating surface 20 is corrugated, the corrugations 22 running in axially parallel manner. The surface 20 defines the heating chamber 23 at the front, the back being defined by the heating chamber wall 24. The latter is also corrugated and the corrugations 25, as is apparent from the detail of FIG. 2, extend substantially radially. The tops of the corrugations on the back of the evaporating surface 20 are supported on the corrugation tops of the heating chamber wall 24. Each evaporating surface 20 and each heating chamber 23 is axially bounded by stop ledges or strips 26 (FIG. 1). The evaporating surface 20 and the heating chamber wall 24 are externally and internally connected to axially parallel tubes 27, 28. The inner tube 27 introduces into the heating chamber 23 the heating steam fed in at the connection 16. For this purpose openings 29 are provided on the casing of the tube 27 and issue into the heating chamber 24. The condensate is led off through openings 30 on the outer tube 28 and through the latter into the lower part 17, so as to be removed by the skimming tube 18.

In the center of the rotor 8 there is provided a cylinder 31, which is bounded at both axial ends by an inwardly drawn ring 32 and in this way forms a ring channel extending over the entire axial length. The starting product is injected into the same by means of a nozzle tube 33 introduced axially parallel into the rotor 8. As shown in FIG. 2, the evaporating surfaces with their axial stop ledges 26 are attached to the outside of the cylinder 31. In the vicinity of the attachment point the cylinder has openings through which the product passes onto the evaporating surface and on which it spreads outwards as a film due to the centrifugal force. At the outer end of the evaporating surface 20 the concentrate runs over the outside of the tube 28 into a channel 34, which is also fixed between the base 9 and the spider 19 and whose bottom from the base to the spider has an increasing radial spacing from the rotor axis. Therefore the concentrate rises axially and passes into a collecting channel 35 from which it is removed by a skimming tube 36. If the rotor casing 8 is provided, it can replace the channels or can additionally hold the same.

The tubes 27, 28, which can also be constructed as drilled bolts, are fixed in the base 9 of the rotor 8. The evaporating surface 20 and the rear heating chamber wall 24 can be fixed on tubular sleeves 38, whose length corresponds to the axial extension of the evaporating surface and by means of which each unit can be engaged on the tubes 27, 28 or the drilled bolts. Finally all the evaporating surfaces 20 of a stack are fixed to the base 9 by means of the spider 19, which is centrally attached to the outside of the cylinder 31, as well as nuts 37.

I claim:

1. A film-type evaporator comprising a vapor chamber, a rotor, means supporting said rotor within said chamber for rotation about an axis of said rotor, at least one evaporating surface mounted on said rotor for rotation therewith and extending outward from the rotor axis and means defining a heating chamber for receiving a heating medium for heating said evaporating surface and rotating therewith, said heating chamber being sealed with respect to the vapor chamber, means for feeding a starting product onto the evaporating surface adjacent to the rotor axis such that said product can be spread outward in the form of a film due to the centrifugal force on the evaporating surface and means for removing the concentrate of said product at the outside of the at least one evaporating surface, wherein the at least one evaporating surface is in the form of a curved blade surface, which is formed by a generatrix substantially parallel to the rotor axis, and upper and lower stop ledges which limit the axial extension of said curved blade surface, and wherein the concave side of the curved blade surface points in the circumferential direction of rotation of the rotor.

2. A film-type evaporator according to claim 1, wherein the evaporating surface is corrugated.

3. A film-type evaporator according to claim 2, wherein the evaporating surface has axially parallel corrugations.

4. A film-type evaporator according to claim 1, wherein the evaporating surface is part of a spiral surface emanating outward from the rotor axis.

5. A film-type evaporator according to claim 4, wherein the spiral surface is formed by a logarithmic spiral.

6. A film-type evaporator according to claim 1, wherein the axial width of the evaporating surface decreases outwards from the rotor axis.

7. A film-type evaporator according to claim 1, wherein said heating chamber is bounded by the at least one evaporating surface, a heating chamber wall running substantially parallel to its back surface and the axial stop ledges.

8. A film-type evaporator according to claim 7, wherein the heating chamber wall is corrugated parallel to the stop ledges and the at least one surface is corrugated such that its corrugation tops facing the heating chamber are supported on the corrugation tops facing it of the heating chamber wall.

9. A film-type evaporator according to claim 7, wherein the at least one evaporating surface and the heating chamber wall are connected at their inner and outer ends with, in each case, one axially parallel tube, which in each case have on their casing portion facing the heating chamber openings and whereof the tube adjacent to the rotor axis is used for the supply and the other tube for the removal of the heating medium.

10. A film type evaporator according to claim 1, wherein the at least one evaporating surface comprises several evaporating surfaces with the same curvature and each of said evaporating surface having an associated heating chamber, said evaporating surfaces and associated heating chambers being arranged in uniformly distributed manner in a radial plane of the motor for rotation therewith.

11. A film-type evaporator according to claim 1, wherein the at least one evaporating surface comprises several evaporating surfaces and each of said evaporating surface having an associated heating chamber, said evaporating surfaces and heating chambers being arranged in axially succeeding, stacked manner on said rotor for rotation therewith.

12. A film-type evaporator according to claim 11, wherein the rotor has a base with a hub for receiving a drive shaft to rotatably drive said rotor and a spider axially spaced from the base, the evaporating surfaces being located between the base and the spider.

13. A film-type evaporator according to claim 12, wherein the evaporating surfaces and the heating chambers associated therewith are fixed to the base by means of tubes for supplying and removing the heating medium and are fixed in the rotor by the spider engaging over the other end thereof.

14. A film-type evaporator according to claim 13, wherein the evaporating surfaces run in channels at their radially outer ends to which they are externally connected to the tubes for removing the heating medium and wherein the bottoms of the channels have an increasing radial distance from the rotor axis from the base of the rotor to the spider and all the channels at their ends facing the base of the rotor issue into a ring channel, from which the concentrate which has collected there is removed by means of a skimming tube of said evaporator.

15. A film-type evaporator according to claim 14, wherein the evaporating surfaces are externally surrounded by a rotor casing, which axially conically widens from the base of the rotor and issues into the concentrate-collecting ring channel, from which the concentrate is removed by means of the skimming tube.

16. A film-type evaporator according to claim 1, wherein said at least one evaporating surface comprises a plurality of evaporating surfaces, and wherein concentrically to the rotor axis is arranged a cylindrical ring channel extending over the axial extension of the evaporating surfaces and whose open side is directed towards the rotor axis and to which the starting product is supplied in axially distributed the manner by means of a nozzle tube and wherein the evaporating surfaces are externally attached in spaced manner to the ring channel and the latter has in the vicinity of the attachment points openings through which the starting product passes from the ring channel to the evaporating surfaces.

* * * * *